United States Patent
Zander et al.

(10) Patent No.: US 10,929,333 B2
(45) Date of Patent: Feb. 23, 2021

(54) SERIAL PERIPHERAL INTERFACE MASTER

(71) Applicant: Axis AB, Lund (SE)

(72) Inventors: Per Zander, Lund (SE); Johan Wennersten, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/799,839

(22) Filed: Feb. 25, 2020

(65) Prior Publication Data

US 2020/0293484 A1 Sep. 17, 2020

(30) Foreign Application Priority Data

Mar. 13, 2019 (EP) ..................... 19162494

(51) Int. Cl.
*G06F 13/42* (2006.01)
*G06F 13/362* (2006.01)
*G06F 13/10* (2006.01)

(52) U.S. Cl.
CPC ........ *G06F 13/4282* (2013.01); *G06F 13/102* (2013.01)

(58) Field of Classification Search
CPC .......................... G06F 13/4282; G06F 13/102
See application file for complete search history.

(56) References Cited

U.S. PATENT DOCUMENTS

| | | | | |
|---|---|---|---|---|
| 6,687,769 B2* | 2/2004 | Cheung | ................. | G06F 13/385 710/52 |
| 7,570,078 B1* | 8/2009 | Tang | ................ | H03K 19/17756 326/39 |
| 2002/0039370 A1* | 4/2002 | Elliot | .................... | H04J 3/0697 370/503 |
| 2011/0305150 A1* | 12/2011 | Haver | .................... | H04L 43/12 370/252 |
| 2016/0350258 A1* | 12/2016 | Mangano | ............ | G06F 13/4291 |
| 2017/0344451 A1 | 11/2017 | Vanderah et al. | | |
| 2019/0050358 A1* | 2/2019 | Levy | .................... | G06F 13/102 |

FOREIGN PATENT DOCUMENTS

| | | |
|---|---|---|
| CN | 202 940 827 U | 5/2013 |
| EP | 0 325 219 A2 | 7/1989 |

OTHER PUBLICATIONS

European Search Report dated Sep. 20, 2019 for EP Patent Application No. 19162494.9, 4 pages.

* cited by examiner

*Primary Examiner* — Idriss N Alrobaye
*Assistant Examiner* — Ronald T Modo
(74) *Attorney, Agent, or Firm* — Xsensus LLP

(57) ABSTRACT

A Serial Peripheral Interface (SPI) master (110) and method therein for transferring data to a peripheral device in a data communication and processing system (100) are disclosed. The SPI master (110) comprises a memory (111) comprising a list of packets, each packet comprises data associated with a time parameter indicating at which time the data is to be transferred to the peripheral device. The time parameter is configurable. The SPI master further comprises a serial transmit and receive unit (112) to transfer the data in the list at a time according to the time parameter associated with the data.

14 Claims, 6 Drawing Sheets

SERIAL PERIPHERAL INTERFACE MASTER

CROSS-REFERENCE TO RELATED APPLICATION

The present application claims priority to EP 19162494.9, filed Mar. 13, 2019, the entire contents of which are incorporated herein by reference.

TECHNICAL FIELD

Embodiments herein relate to a Serial Peripheral Interface (SPI) master. Further they relate to a data communication and processing system comprising the SPI master.

BACKGROUND

In data communication and processing systems, such as video surveillance systems, network audio systems, wireless communication systems, radar systems etc., many peripheral circuits, like sensors, cameras, video units, analog-to-digital converters (ADCs), digital-to-analog converters (DACs), audio codec, motor control devices, and similar, are configured and controlled via the SPI protocol, by a central processing unit (CPU) in a main system chip. In some applications, the peripheral circuits need to be re-configured in real time, with only a small time windows allowed for the SPI commands. With traditional interrupt driven or direct memory access (DMA) driven SPI, it may be difficult to start the transfer at the correct time so that it fits within the allowed time window.

Typically, the problem is solved by using a dedicated microcontroller for the time critical SPI communication. However, using dedicated microcontroller will increase the cost. In U.S. Pat. No. 6,687,769, an improved high-performance buffering scheme is provided with a SPI to enable microcontroller-based products and other components and devices to achieve a higher serial transmit and receive data rate. The buffering scheme can provide a high data rate without requiring frequent CPU polling or high interrupt overhead. The buffering scheme is configured with an interrupt configuration for identifying when data is ready for transmitting or for reading by the CPU. However, this software control is quite complicated and it does not solve the problem, i.e. to get the SPI transfer to happen at exactly the desired time.

SUMMARY

In light of the above it is an object of embodiments herein to provide an improved method and apparatus for transferring data to a peripheral device in a data communication and processing system.

According to one aspect of embodiments herein, the object is achieved by a SPI master for transferring data to a peripheral device in a data communication and processing system. The SPI master comprises a memory comprising a list of packets. Each packet comprises data associated with a time parameter indicating at which time the data is to be transferred to the peripheral device. The time parameter is configurable. The SPI master further comprises a serial transmit and receive unit to transfer the data in the list at a time according to the time parameter associated with the data.

According to one aspect of embodiments herein, the object is achieved by a method performed in a SPI master for transferring data to a peripheral device in a data communication and processing system. The SPI master comprises a memory comprising a list of packets and a serial transmit and receive unit. Each packet comprises data associated with a time parameter indicating at which time the data is to be transferred to the peripheral device. The time parameter is configurable. The SPI master transfers the data in the list to the peripheral device at a time according to the time parameter associated with the data.

In other words, the SPI master according to embodiments herein has an internal memory, e.g. a Random Access Memory (RAM), where a list of packets, i.e. SPI transfers, may be queued up and then performed at different well-defined times. The SPI master according to embodiments herein has the ability to start processing the list of packets and the SPI transfer at a configurable absolute time e.g. from a global timer in the system, or start to process the list of packets and transfer by receiving an external signal from the data communication and processing system, or start to process the list of packets and transfer after waiting a configurable time from receiving an initiating signal from the data communication and processing system. The list may be looped, so that the same sequence of SPI transfers may be repeated for a configurable number of times.

The SPI master according to embodiments herein may be implemented as a functional block in a main system chip.

The SPI master according to embodiments herein provides more precise control over the timing than what can usually be achieved with the software control, even in the case with a dedicated microcontroller. The method performed in the SPI master according to embodiments herein is less complicated, since the timing is handled mostly in hardware. The SPI master can be integrated into the main system chip and save cost by skipping an external microcontroller component.

Thus, the embodiments herein provide an improved method and apparatus for transferring data to a peripheral device in a data communication and processing system.

BRIEF DESCRIPTION OF THE DRAWINGS

Examples of embodiments will be described in more detail with reference to attached drawings in which.

DETAILED DESCRIPTION

Figure 1:
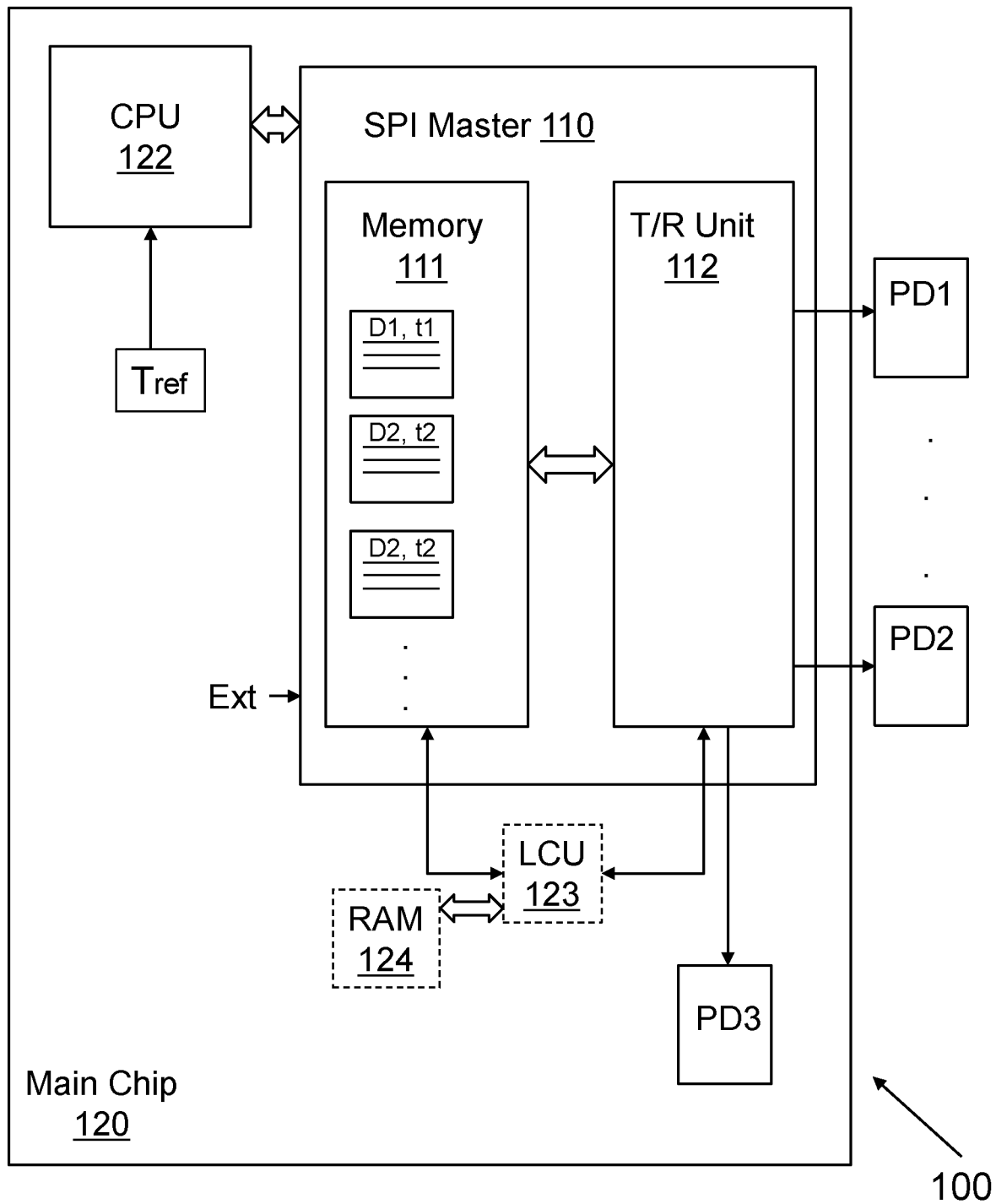
FIG. 1 is schematic block diagram illustrating a data communication and processing system in which a SPI master according to embodiments herein may be implemented.

FIG. 1 is schematic block diagram illustrating a data communication and processing system 100 in which a SPI master 110 according to embodiments herein may be implemented.

The data communication and processing system 100 may be any one of a video surveillance system, a network audio system, a wireless communication system, a radar system etc. The data communication and processing system 100 comprises a main system chip 120. The main system chip 120 comprises a CPU 122. The data communication and processing system 100 may further comprise one or more peripheral circuits or devices PD1, PD2, PD3 . . . , such as sensors, cameras, video units, ADCs, DACs, audio codec, motors etc. The peripheral devices PD1, PD2, PD3 may be located or integrated on the main system chip 120 or located outside the main system chip 120.

According to the embodiments herein, the SPI master 110 comprises a memory 111 comprising a list of packets, each packet comprises data D1, D2, D3, . . . associated with a time parameter t1, t2, t3, . . . indicating at which time the data is to be transferred to the peripheral device. The time parameter is configurable and it is set up to make sure that certain events in the peripheral devices happen at certain times, because they are required by applications. The time parameter is configurable and may be configured based on different applications, operation mode, operation mode parameters etc. for the peripheral device.

The SPI master 110 further comprises a serial transmit and receive unit T/R 112 to communicate with the he peripheral devices PD1, PD2, PD3. The serial transmit and receive unit T/R 112 transfers the data in the list to the peripheral circuits PD1, PD2, PD3 at a time according to the time parameter associated with the data.

The SPI master 110 may be implemented as a function block in the main system chip 120. The CPU 122 may interact with the SPA master 110 for controlling operations of the one or more peripheral devices PD1, PD2, PD3.

The data communication and processing system 100 may further comprise one or more RAM 124 for store other data or configurations.

There are several ways to trigger the serial transmit and receive unit 112 to start processing the list of packets and transfer data.

According to some embodiments herein, the SPI master 110 may receive a signal Ext from the data communication and processing system 100 and this received external signal will trigger the serial transmit and receive unit 112 to start processing the list of packets.

According to some embodiments herein, the serial transmit and receive unit 112 may start to process the list of packets after waiting a configurable time from receiving an initiating signal from the data communication and processing system.

According to some embodiments herein, the serial transmit and receive unit 112 may start to process the list of packets at a configurable absolute time, i.e. the serial transmit and receive unit 112 may start to process the list of packets when a timer with an absolute time expires. The timer may be a global timer in the data communication and processing system 100 or referred to the global timer.

Figure 2:
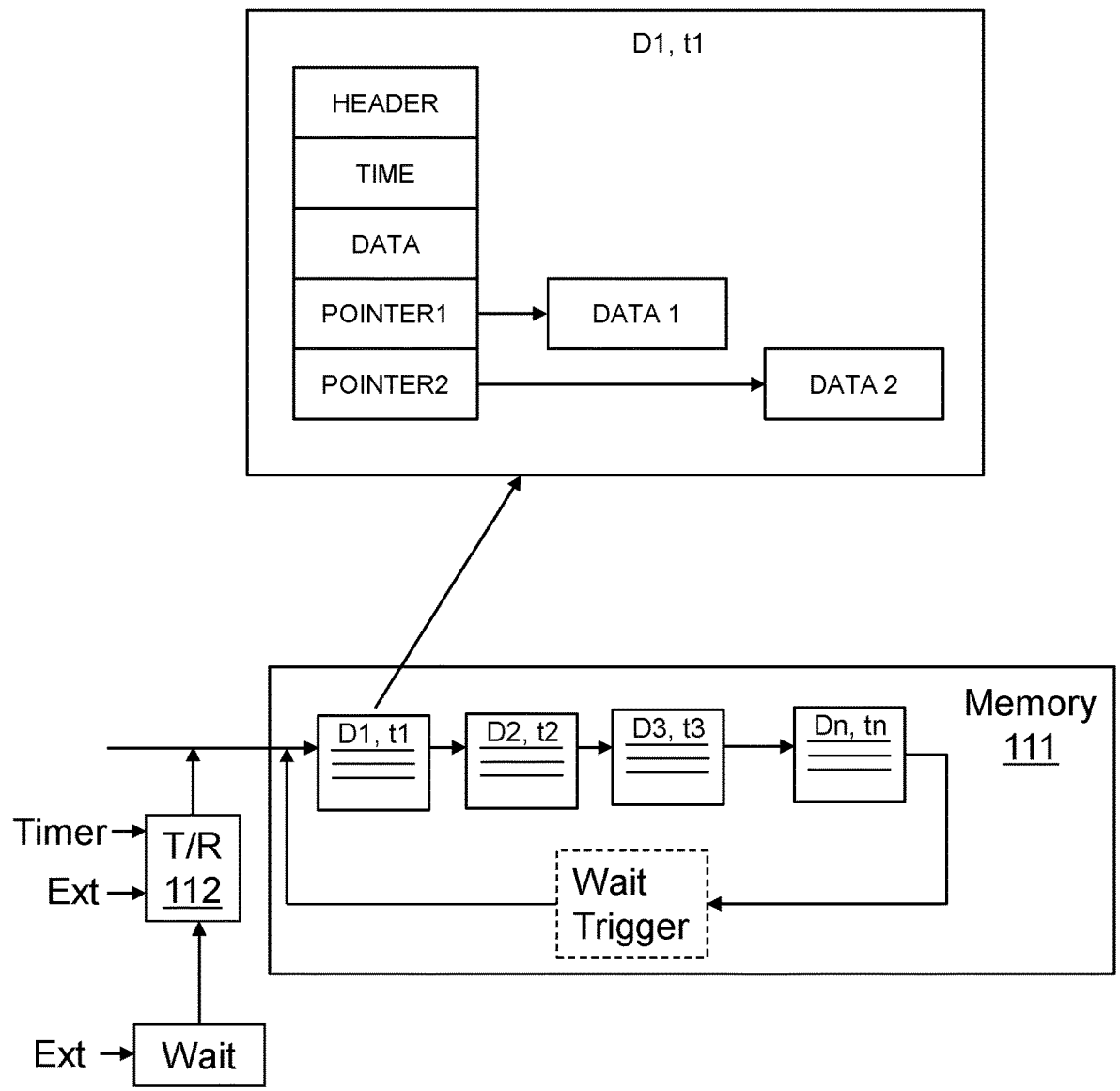
FIG. 2 is schematic block diagram illustrating a list of packets stored in a memory and an example structure of a data packet according to embodiments herein.

FIG. 2 shows a list of packets stored in the memory 111 and an example structure of a data packet according to embodiments herein. In each data packet, beside the parameters TIME and DATA, it may comprise a header HEADER. The header indicates which peripheral device to communicate with, but also the packet length and operational mode for the SPI protocol. There are may be several SPI protocol variants and the SPI master needs to select the correct mode to match the peripheral device. For transmit data, the data may be either directly in the packet DATA or there may be a pointer POINTER1 to a separate data area DATA1 or both.

There may be more data pointers such as POINTER2, DATA2 if one want to split up the packet in several buffers.

For receive data it may have the similar situation. The SPI master may reserve space in the packet data itself or may provide one or more pointers to separate data area, or both. According to some embodiments herein, transmit data may be directly in the packet, and a pointer for receive data to a separate receive buffer.

According to some embodiments herein, the serial transmit and receive unit 112 may transfer the data in the list of packets in a loop structure such that the packets in the list is repeated for a configurable number of times, as shown in FIG. 2. Between each loop, there may be a wait trigger. However, it may be not necessary to wait for a trigger between loops.

Depending on different applications and configurations for different peripheral devices, the time parameter associated with the data in each packet may be configured differently.

According to some embodiments herein, the time parameter associated with the data may be an absolute time.

According to some embodiments herein, the time parameter associated with the data may be a relative time. For example, the time parameter of the current packet is relative to the start or the end time of the previous packet.

Basically it does not matter except for the start of the first packet, where an absolute time is useful when one device wants to start at the same time as some other devices. Then both devices are configured to have the same start time and wait until that time is due. After the first packet it is only an implementation decision whether relative or absolute time is preferred.

According to some embodiments herein, the time parameter associated with the data may be deduced using event information from the peripheral device. For example, if the SPI master is for a motor control device, one can read out information e.g. speed, position, current, voltage, depending on type of motor. Then the times when to send out commands to the motor are calculated based on the information from the motor.

According to some embodiments herein, at least the time parameter for the data in the first packet is determined based on a trigger signal received from the peripheral device. For example, the SPI master may get a trigger signal from an image sensor or a whole camera when it starts exposure. Then it is possible to fire off a series of flashes with an electronic flash controlled by the SPI master at specific times related to the start of the exposure.

According to some embodiments herein, the time parameter associated with the data may be deduced using an absolute time communicated from some other part of the data communication and processing system 100, i.e. not from the controlled peripheral device itself. The other part of the data communication and processing system 100 may control some other peripheral devices, and it is necessary that both actions to take effect at the same time or with a known time difference. For example, in a stereo camera case, there has two cameras and in each camera the SPI master 110 controls when to take pictures. The two cameras have a common absolute time, e.g. through Global Positioning System (GPS) or Precision Time Protocol (PTP) which is an extension to Ethernet. Both cameras get the same absolute start time so they can start to take pictures in a synchronized manner.

According to some embodiments herein, one or more time parameters in the list may be determined by using operating mode parameters of the peripheral device. For example, the time parameter associated with the data in the first packet and a time difference between the consecutive packets in the list may be deduced based on the operating mode parameters of the peripheral device.

For example, to control a radar transmitter, operating mode parameters such as when to turn on and off power, to set power level and/or frequency of the transmitter at specific values at precise times to form the correct radar beam, etc., may be used to determine the time parameters and/or a time difference between the consecutive packets in the list.

Another example may be controlling an image sensor, where one may want to change gain or exposure time in blanking intervals between lines or between frames. Operating mode parameters such as blanking intervals, frame rate etc. may be used to determine the time parameters and/or time difference between the consecutive packets in the list.

The list of packets and the time parameters associated with the data in each packet may be pre-determined or configured by the CPU 122 in the data communication and processing system 100 and stored in the memory 111 of the SPI master 110.

According to some embodiments herein the data communication and processing system 100 may further comprises a local control unit LCU 123 and the list of packets and the time parameters associated with the data in each packet may be predetermined or configured and set up by the local control unit LCU 123.

According to some embodiments herein, the time parameter may be adjusted by adding a latency factor to account for any significant latency in the data communication and processing system 100. The latency factor may be an adjustable factor that may be changed in a predetermined fashion depending on which peripheral device the SPI is transmitting to. For example, if there are two peripheral devices with different clock speeds on the SPI bus, then it is possible to add a delay to the faster device and start the transmission to the slower device first, so that they end at the same time.

Depending on different applications and configurations for different peripheral devices, the data in the list of packets may be different. The peripheral device may be any one of a radar system, an image sensor, an audio codec, an analog-to-digital converter, a digital-to-analog converter, a motor control device, a camera or a video unit.

According to some embodiments herein, the data in at least one packet may be configuration data to be transferred to a peripheral device.

For example, for a camera, the configuration data may correspond to e.g. gain and exposure time, aperture, optical image stabilization, zoom etc.

Figure 3:
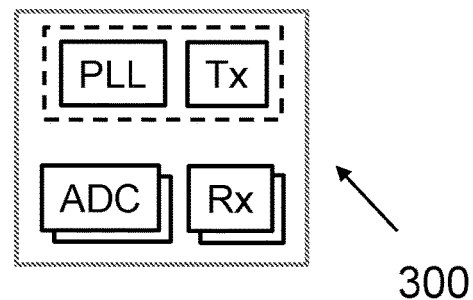
FIG. 3 is schematic block diagram illustrating a radar system.

For a radar system, chirps in radar transmission may be configured and controlled. FIG. 3 shows a radar system 300 comprising one or more radars. Each radar has a transmitter (Tx) possibly with a phase locked loop (PLL), one or more receiver (Rx) and one or more ADCs. For example, there may be up to 4 radars but only two run at a time. In a 4-radar case there may be only one Rx and one ADC in each radar. This means that it may have up to 16 devices, i.e., 16 chips to select and configure.

All devices need configuration via the SPI protocol, but only the Tx and its PLL, if separate, needs run-time re-configuration.

Figure 4:
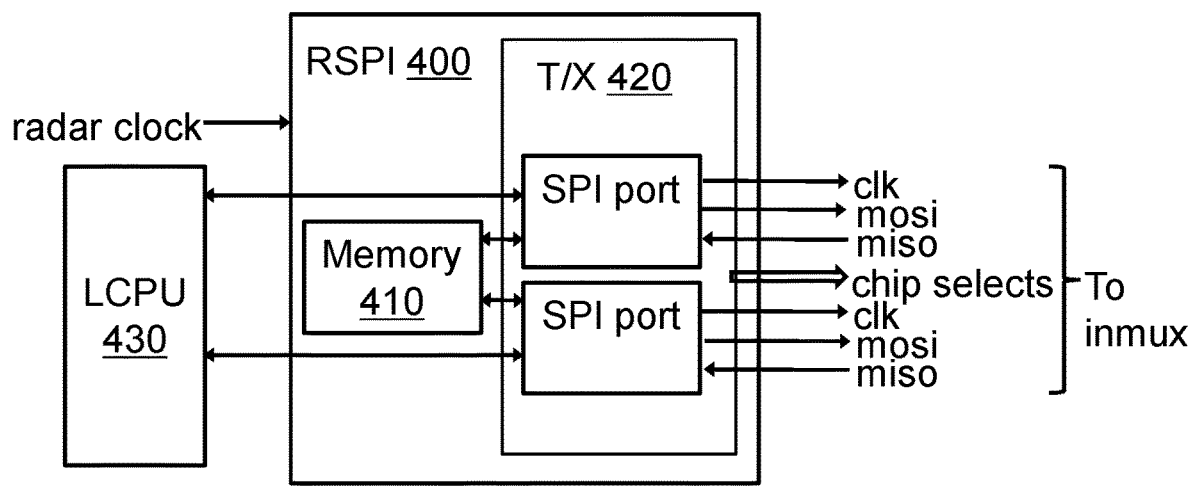
FIG. 4 is schematic block diagram illustrating a radar SPI master according to embodiments herein.

FIG. 4 shows a SPI master RSPI 400 according to some embodiments herein for a radar system. The RSPI 400 comprises an internal memory 410, a serial transmit and receive unit T/X 420 with two SPI ports. The serial transmit and receive unit 420 has one or more chip select output pins chip selects, i.e. one chip select output pin per peripheral device, and 6 input/output pins, i.e. 2 clock clk pins, 2 master out/slave in (MOSI) mosi pins and 2 master in/slave out (MISO) miso pins. Each SPI port has its 3 pins clk, mosi, miso. A local CPU LCPU 430 is also shown in FIG. 4 together with the RSPI 400.

According to the SPI protocol, the SPI bus allows to transmit and receive data simultaneously on two lines MOSI and MISO. Clock polarity (CPOL) and clock phase (CPHA) are the main parameters that define a clock format to be used by the SPI bus.

Figure 5:
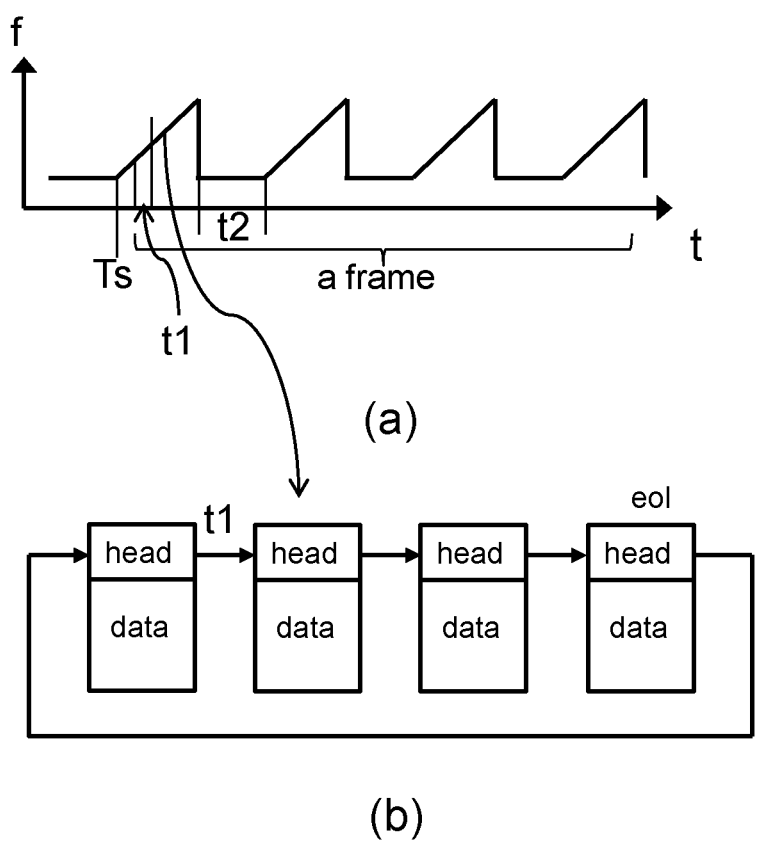
FIG. 5 is a schematic diagram illustrating a chirp signal with a list of data packets according to embodiments herein.

The following is a list of registers in RSPI 400:
rw_cfg Module enable, bit clock polarity, timer clock source, MOSI pin mode
rw_trig Trigger input mode and pin selection
rw_clk Bit clock frequency
rw_mem_wr_ptr Address for internal memory writes
rw_mem_wr Write to internal memory, each write increments rw_mem_wr_ptr
rw_head_wr Alias for rw_mem_wr, with fields describing the packet head
rw_rec_wr Alias for rw_mem_wr, with the receive address field of the packet head
rw_mem_rd_cfg Address and read pattern for internal memory reads
rs_mem_rd Read from internal memory, each read updates rw_mem_rd_cfg
rw_first Address for first packet in list
rw_cnt Loop counter for the list
rw_time Start time for the list, double buffered
rw_start Start command
r_stat Status register
r_intr . . . Interrupt registers
rw_cs_cfg Chip select polarity, separate scope, common for both ports The following is a list of interrupts in RSPI 400:
rdy SPI port ready to get a new start command
idle SPI port is idle
pkt A packet with the pkt_irq field set was completed
eol A packet with the eol field set was completed The radar 300 transmits chirps. A chirp is a signal where the frequency increases or decreases with time. That is the transmit frequency is changed in ramps, as shown in FIG. 5 (a). The chirp signal may be sent in frames, each frame may contain two or more ramps. This may be configured and controlled by the list of packets in the SPI master 110.

Typically there are several packets needed to control one ramp. For example, a packet to turn power on, a packet to start frequency ramping, a packet to stop frequency ramping, a packet to turn off power etc. All these packets need to be sent at correct times. FIG. 5 (b) shows a list of packets for one ramp. The sequence of packets for one ramp is repeated for each ramp in a frame. Timing between packets within ramp t1 and between ramps t2 in a frame is very critical, e.g. about 500 ns precision is needed. Further, start of a frame Ts must also be at an accurate time.

As shown in FIG. 5 (b), the packets may be organized in linked lists as a loop in the memory 410. The list may be repeated for a configurable number of times. More generally, the transfer processing will stop when the end-of-list eol is passed for a configurable number of times. Each loop may correspond to one or 2 or more chirps but there are several commands, i.e. packets, sent for each chirp as described above. The number of chirps in a frame typically corresponds to the number of times the list of packets loops. According to some embodiments herein, the list of packets may be made longer so it covers two chirps e.g. if two alternating types of chirps are needed.

Figure 6:
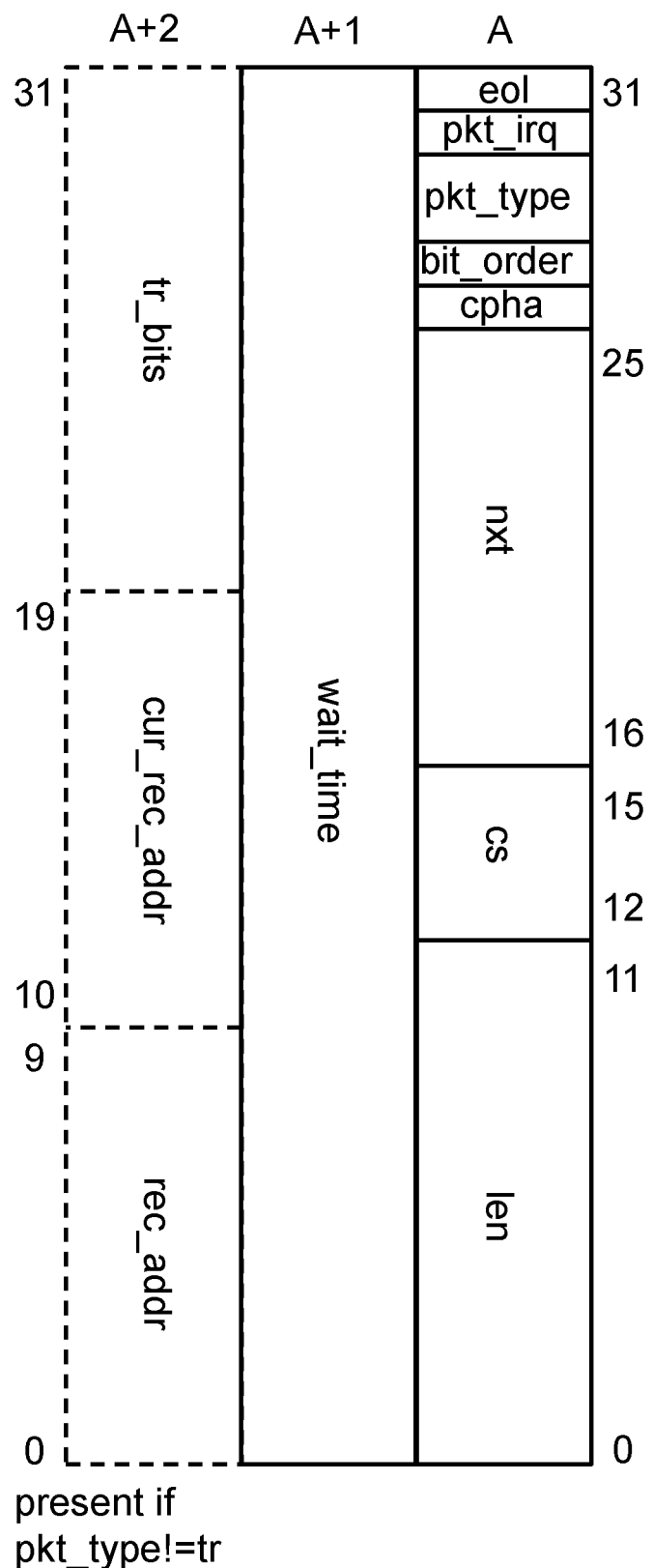
FIG. 6 is a schematic block diagram illustrating an example structure for a packet head according to embodiments herein.

FIG. 6 shows an example structure for a packet header. The header consists of two or three 32-bit words, depending on whether the received data is discarded or not. The fields of the header are described in the following Table 1.

TABLE 1

| Field | Size | Description |
|---|---|---|
| len | 12 | Packet length in number of bits |
| cs | 4 | Chip select output to be used for the transfer |
| nxt | 10 | Address to the next packet in the list, in number of 32-bit words |
| cpha | 1 | CPHA mode to be used for the transfer. |
| bit_order | 1 | Bit order to be used for the transfer.<br>0 (msb): MSB transmitted/received first within words<br>1 (lsb): LSB transmitted/received first within words |
| pkt_type | 2 | Selects how the transmit and receive bits of the packet are used.<br>0 (tr): Transmit only, discard receive data<br>1 (normal): Transmit and receive all packet bits<br>2 (burst_rd): Transmit tr_bits bits followed by a fixed value, receive all bits<br>3 (half duplex): Half duplex mode |
| pkt_irq | 1 | Set if the pkt interrupt shall be generated when the transfer of the packet is completed |
| eol | 1 | End of list marker. The list processing stops when a packet with this field set has been transferred the number of times configured in rw_cnt. |
| wait_time | 32 | Wait time (in number of clock cycles of the reference clock configured in rw_cfg.time_src) from the start of the previous packet to the start of the current packet. |
| rec_addr | 10 | Address (in number of 32-bit words) to the start of the read data buffer for the packet. This field is not present if the pkt_type field is set to tr. |
| cur_rec_addr | 10 | Address (in number of 32-bit words) to the current position in the read data buffer for the packet. The field is updated when the transfer of the packet is completed. This field is not present if the pkt_type field is set to tr. |
| tr_bits | 12 | Number of transmit bits in the packet. This field is not present if the pkt_type field is set to tr.<br>This field is ignored if the pkt_type field is set to normal. |

Time between packets t1 may be configured in the packet head. Time t1 may be counted in number of radar clock cycles, or using an internal clock.

Start time Ts for the first packet may be configured in a register. This register can be written from the controlling CPU, either the main CPU or the LCPU. Ts is continuously compared with the absolute time timer in the system, and a start pulse or a trigger signal is generated when it matches. Alternatively, the first packet may start immediately, or after receiving an external trigger signal.

Packet length, chip selects, dada bit order etc. may also be configured in the packet head.

It may also be configured in the packet head whether a received data is stored or not, and where in the internal RAM to store it, with rec_addr.

Figure 7:
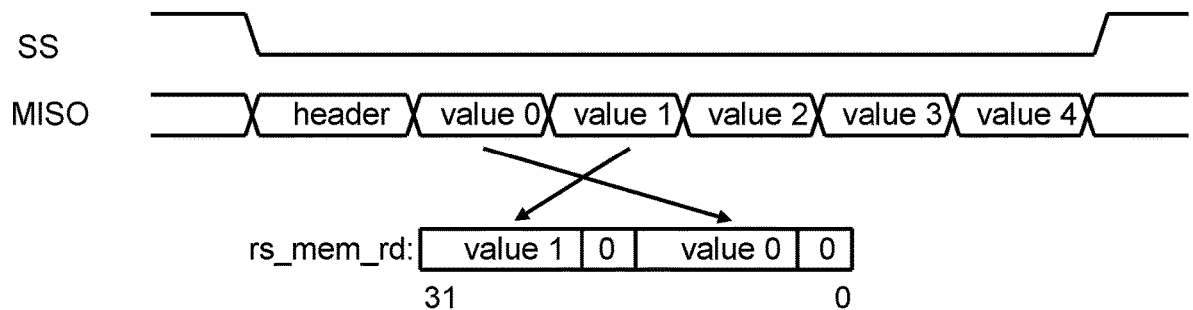
FIG. 7 is a schematic diagram illustrating a packet structure according to embodiments herein.

One SPI packet may contain several packed data values e.g. 12 bit values, as shown in FIG. 7. The values may need to be padded to 16 or 32 bits and reordered to match the data format of a radar subsystem. Padding and reordering may be configured in the register rw_mem_rd_cfg. Bit clock frequency may be configurable, e.g. from 3.2 kHz to 50 MHz. In this example, the RSPI 400 module is clocked with a 400 MHz clock and the internal memory 410 size is 4 kbyte, i.e. 1 k×32.

Figure 8:
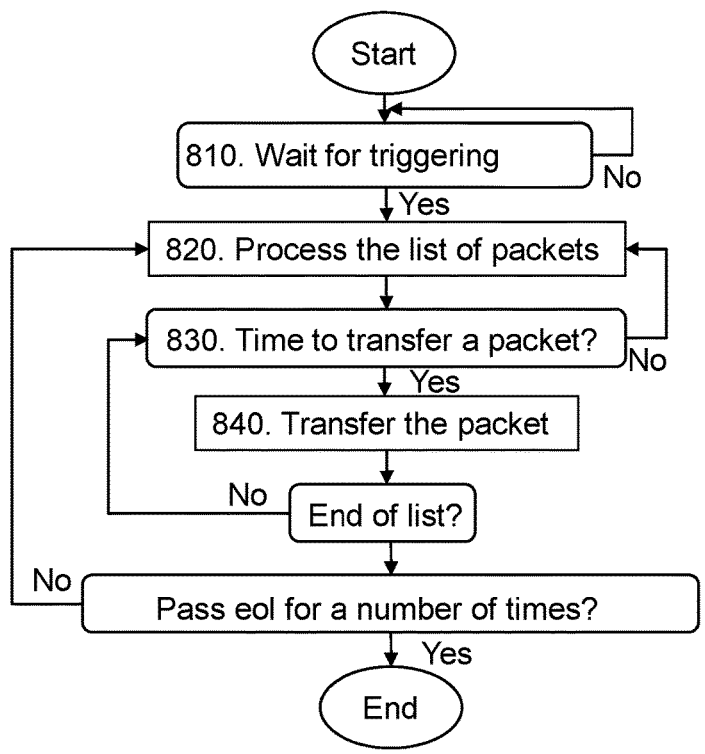
FIG. 8 is a flow chart illustrating a method performed in the SPI master according to embodiments herein.

A method performed in the SPI master 110 for transferring data to a peripheral device in a data communication and processing system 100 will be described now with reference to FIG. 8. As described above, the SPI master 110 comprises a memory 111 comprising a list of packets and a serial transmit and receive unit 112. Each packet comprises data associated with a time parameter indicating at which time the data is to be transferred to the peripheral device. The method comprises the following actions.

Action 810

The SPI master 110 waits for a trigger signal for the serial transmit and receive unit 112 to start process the list of packets.

The trigger signal may be an external signal from the data communication and processing system 100. The serial transmit and receive unit 112 may start to process the list of the packet after receiving the external signal. The serial transmit and receive unit 112 may also start to process the list of the packet after waiting a configurable time from receiving the external signal.

The trigger signal may also be a timer with a configurable absolute time and the serial transmit and receive unit 112 may start to process the list of packets when the timer expires.

Action 820

The serial transmit and receive unit 112 starts to process the list of packets, such as read out the list of packets from the memory 111, get information from the packet header which contains the specific configurations for the packet such as start time, packet length, bit order and CPHA mode, a pointer to the next packet etc.

Action 830

The serial transmit and receive unit 112 checks the time parameter associated with the data and waits until it is time to transfer the data in a packet.

Action 840

The serial transmit and receive unit 112 transfer data in the list of packets at a time according to the time parameter associated with the data. The serial transmit and receive unit 112 continues to process the list of packets until all packets have been sent. The pkt_irq field in the packet header is used for generating an interrupt, pkt, when the packet is fully processed.

The serial transmit and receive unit 112 may transfer the data in the list of packets in a loop structure such that the list of packets is repeated for a configurable number of times.

The serial transmit and receive unit 112 may check if eol is passed for a configurable number of times. The eol is an end-of-list marker. The processing of the packet list stops when a packet with this field set has been transferred the number of times which is configured in rw_cnt.

To summarise, the SPI master 110, 400 and method therein according to embodiments have some advantages. For example, it provides possibility for run-time configurations for the peripheral devices so that transfer of the configurations fits within the allowed time window. It provides more precise control over the timing than what can usually be achieved by the prior art solutions with the software control, even in the case with a dedicated microcontroller. It provides a less complicated method, since the timing is handled mostly in hardware. It saves cost by being integrated into the main system chip without using an external microcontroller component.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A Serial Peripheral Interface (SPI) master for transferring data to a peripheral device in a data communication and processing system, the SPI master comprises:
    a memory comprising a list of packets, each packet comprises data associated with a time parameter indicating at which time the data is to be transferred to the peripheral device, wherein the time parameter is configurable, one or more time parameters in the list of packets are determined by using operating mode parameters of the peripheral device; and
    a serial transmit and receive unit to transfer the data in the list at a time according to the time parameter associated with the data.

2. The SPI master according to claim 1, wherein the serial transmit and receive unit is triggered to start to process the list of packets by an external signal received from the data communication and processing system.

3. The SPI master according to claim 1, wherein the serial transmit and receive unit starts to process the list of packets after waiting a configurable time from receiving an initiating signal from the data communication and processing system.

4. The SPI master according to claim 1, wherein the serial transmit and receive unit starts to process the list of packets at a configurable absolute time.

5. The SPI master according to claim 1, wherein the serial transmit and receive unit transfers the data in the list of packets in a loop structure such that the list of packets is repeated for a configurable number of times.

6. The SPI master according to claim 1, wherein the time parameter associated with the data in each packet is an absolute time or a relative time.

7. The SPI master according to claim 1, wherein at least one time parameter associated with the data is deduced using event information or a trigger signal from the peripheral device.

8. The SPI master according to claim 1, Wherein the data in at least one packet is configuration data to be transferred to the peripheral device.

9. The SPI master according to claim 1, wherein the peripheral device is any one of a radar system, an image sensor, an audio codec, an analog-to-digital converter, a digital-to-analog converter, a motor control device, a camera, a video unit.

10. The SPI master according to claim 1 is implemented as a function block in a main system chip comprising a central processing unit for controlling operations of one or more peripheral devices.

11. The SPI master according to claim 1, further comprising a data communication and processing system.

12. The SPI master according to claim 11, wherein the data communication and processing system is any one of a video surveillance system, a network audio system, or a radar system.

13. A method performed in a SPI master for transferring data to a peripheral device in a data communication and processing system, wherein the SPI master comprises a memory comprising a list of packets and a serial transmit and receive unit, wherein each packet comprises data associated with a time parameter indicating at which time the data is to be transferred to the peripheral device, one or more time parameters in the list of packets are determined by using operating mode parameters of the peripheral device, the method comprising:
    waiting for a trigger signal for the serial transmit and receive unit to start process the list of packets;
    processing the list of packets;
    checking if it is time to transfer a data packet according to the time parameter associated with the data; and
    transferring the data packets at the time according to the time parameter associated with the data.

14. The method according to claim 13, wherein the serial transmit and receive unit transfers the data in the list of packets in a loop structure such that the list of packets is repeated for a configurable number of times.

* * * * *